(12) United States Patent
Vadapandeshwara et al.

(10) Patent No.: US 10,831,550 B2
(45) Date of Patent: Nov. 10, 2020

(54) COMPUTERIZED CONTROL OF EXECUTION PIPELINES

(71) Applicant: ORACLE FINANCIAL SERVICES SOFTWARE LIMITED, Mumbai (IN)

(72) Inventors: Rajaram N. Vadapandeshwara, Bangalore (IN); Charles Rajkumar, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 169 days.

(21) Appl. No.: 15/936,606

(22) Filed: Mar. 27, 2018

(65) Prior Publication Data
US 2019/0303207 A1    Oct. 3, 2019

(51) Int. Cl.
G06F 9/50    (2006.01)
G06F 9/48    (2006.01)

(52) U.S. Cl.
CPC .......... *G06F 9/5044* (2013.01); *G06F 9/4843* (2013.01); *G06F 9/5038* (2013.01); *G06F 2209/503* (2013.01)

(58) Field of Classification Search
None
See application file for complete search history.

(56) References Cited

U.S. PATENT DOCUMENTS

| | | |
|---|---|---|
| 9,086,923 B2 | 7/2015 | Manish et al. |
| 9,588,685 B1 | 3/2017 | Watson et al. |
| 2015/0163179 A1 | 6/2015 | Herman et al. |

FOREIGN PATENT DOCUMENTS

WO    2017/019465 A1    2/2017

OTHER PUBLICATIONS

Papazoglou M P et al: "Service-Oriented Computing: State of the Art and Research Challenges", Computer, IEEE Computer Society, USA, vol. 40, No. 11, Nov. 19, 2007 (8 pgs).
Wagner Florian et al: "Applying QoS-Aware Service Selection on Functionally Diverse Services", Dec. 5, 2011 Serious Games: [Lecture Notes in Computer Science; Lec.Notes Computer], Springer International Publishing Cham, pp. 100-113, XP047500046.
Incheon Paik et al: "A Scalable Architecture for Automatic Service Composition", IEEE Transactions on Services Computing, vol. 7, No. 1, Nov. 20, 2012, pp. 82-95, XP055597048.
Patent Cooperation Treaty (PCT), International Search Report and Written Opinion for PCT International Application No. PCT/IN2019/050247, PCT International Filing Date Mar. 27, 2019, dated Jun. 28, 2019 (19 pages).

*Primary Examiner* — Eric C Wai
(74) *Attorney, Agent, or Firm* — Kraguljac Law Group, LLC

(57) ABSTRACT

Systems, methods, and other embodiments associated with controlling an execution pipeline are described. In one embodiment, a method includes generating an execution pipeline for executing a plurality of tasks. The example method may also include evaluating execution definitions of the tasks to identify execution properties of the plurality of tasks. The example method may also include assigning each task to an execution environment selected from a set of execution environments based upon execution properties of the task matching execution properties of the execution environments. The example method may also include controlling the execution pipeline to execute each task within the assigned execution environments.

18 Claims, 11 Drawing Sheets

COMPUTERIZED CONTROL OF EXECUTION PIPELINES

BACKGROUND

Many corporations assemble and maintain computer infrastructure to store and process large amounts of data. Such data processing can be performed through an analytical pipeline that executes a plurality of tasks within a single execution environment, such as a data center. The tasks can be interdependent such that one task reads data, processes the data, and outputs results that are then used by another task. Because each task can process a large amount of data and output complex results that are not finite, execution of the analytical pipeline can be very complex. A single execution environment for processing the tasks is inefficient and impractical because the execution environment is not tailored to the particular execution properties of each task, such as memory and processing requirements, service level agreement requirements, security requirements, etc. Analytical pipelines are also complex because they deal with historical data, distributed data, and/or sensitive data that may not be safely stored in a cloud. Also, analytical pipelines have service level agreement requirements and can utilize a variety of applications and platforms that reside and maintain distributed data in various locations.

SUMMARY

Computerized systems and methods are described herein that control an execution pipeline. In one embodiment, a non-transitory computer-readable medium is disclosed that stores computer-executable instructions that when executed by a processor of a computer causes the processor to: generate an execution pipeline for executing a plurality of tasks derived from a run definition comprising execution definitions of each task of the plurality of tasks; evaluate the execution definitions to identify execution properties of the plurality of tasks; assign each task of the plurality of tasks to an execution environment selected from a set of execution environments based upon the execution properties of the tasks matching execution properties of the execution environments, wherein each execution environment executes tasks with different resources and functionality; and control the execution pipeline to execute each task within the assigned execution environments, wherein the execution definitions of each task are transformed into formats compatible for execution by the assigned execution environments.

BRIEF DESCRIPTION OF THE DRAWINGS

The accompanying drawings, which are incorporated in and constitute a part, of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
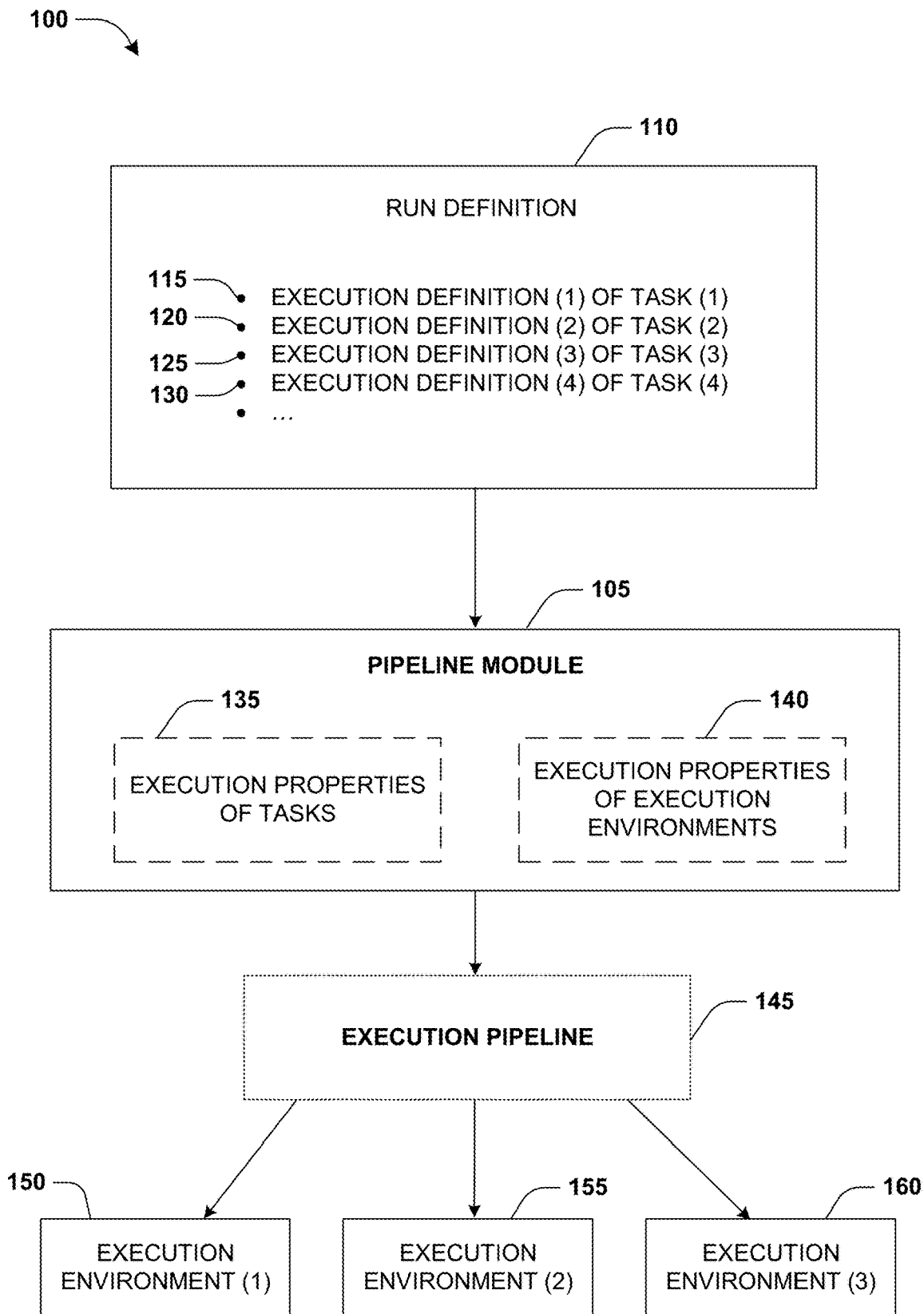
FIG. 1 illustrates an embodiment of a system associated with controlling an execution pipeline.

Computerized systems and methods are described herein that control an execution pipeline. A pipeline module generates and controls the execution pipeline to execute tasks within selected execution environments that provide functionality and resources suited for executing particular tasks. In particular, the pipeline module selects particular execution environments from a set of available execution environments to execute certain tasks based upon a degree of matching between execution properties of the execution environments and execution properties of each task. Thus, an execution environment that has resources and functionality tailored for executing a task is assigned to execute that task. The pipeline module orchestrates the execution of tasks through the pipeline module in a manner that reduces the movement or copying of data between execution environments in order to conserve processing resources, storage resources, and network bandwidth. Executing tasks within selected execution environments improves computational efficiency for executing tasks, which conserves processing and storage resources.

In one embodiment, given a set of tasks that are received for execution, the pipeline module compares and matches execution properties of the tasks to execution properties of execution environments in order to assign tasks to certain execution environments. Execution properties of tasks can comprise input/output parameters, instructions, and/or other functions or requirements used by the tasks to execute. In one embodiment, the execution properties can comprise memory requirements, data security requirements, type of computes/calculations to be executed, types of transforms to be executed to transform inputs of the task to outputs, or program code to be executed, types and amounts of data to be processed, service level agreements, locations of where data resides, and/or processing requirements of the task such as CPU cycles. Other execution properties of tasks can comprise utilization of representational state transfer (REST) services, analytical models to be used, a task depending upon a result outputted by another task, whether tasks are synchronous or asynchronous, whether tasks can be performed in parallel, a type of execution platform that is compatible with a task, and/or a variety of other execution properties.

Execution properties of execution environments define what resources are available for executing tasks. In one embodiment, the execution properties of execution environments may comprise processing resources, security properties, available execution platforms, available application programming interfaces (APIs), etc. Other execution properties of execution environments may comprise available database resources and functionality, an ability to process data in-memory, cluster computing properties, cloud computing properties, hardware properties, available services, and/or a variety of other execution properties.

The execution properties of tasks are compared and matched to execution properties of execution environments to assign execution environments to execute a certain task. By performing a matching process and determining which execution environment is better suited to execute a particular task, the pipeline module controls the execution of tasks within selected execution environments in a manner that improves execution efficiency, computing resource utilization, and network bandwidth utilization. The present system thus improves execution efficiency of a computing system as compared to a system that uses one type of execution environment to execute all types of tasks as stated previously.

With reference to FIG. 1, one embodiment of a computer system 100 associated with controlling an execution pipeline is illustrated. The computer system 100 includes a pipeline module 105, which can be configured to execute on a computer, such as computer 915 of FIG. 9. The pipeline module 105 is configured to improve the processing of tasks that are grouped into a run, such as a first task, a second task, a third task, a fourth task, etc. In one embodiment, a run is a data structure defining a grouping of tasks to be executed, such as sequentially and/or in parallel. A run definition 110 of the run defines the tasks through execution definitions, such as a first execution definition 115 of the first task, a second execution definition 120 of the second task, a third execution definition 125 of the third task, and a fourth execution definition 130 of the fourth task.

In one embodiment, the execution definitions are declarative. Thus, an execution definition uses declarative statements to define parameters of a task and how the task is to be executed. For example, an execution definition for a task may define input parameters, output parameters, commands and methods to execute, functions to call, services to access, analytical models to use, analysis to perform, etc. The run definition 110 may describe a wide variety of tasks through execution definitions. In one embodiment, the run definition 110 describes tasks to calculate probabilities that bank customers will default on loans, tasks to monitor and predict employee retirement rates, tasks to identify high profit activities for a bank to perform, etc. In another embodiment, the run definition 110 describes tasks related to a wide variety of industries, such as the implementation of business logic of utility companies, corporations, businesses, government entities, etc.

The pipeline module 105 is configured to generate an execution pipeline 145 through which the tasks of the run will be executed within selected execution environments that are best suited for each task. In particular, the pipeline module 105 evaluates the execution definitions of the tasks to identify execution properties 135 of the tasks. The execution properties 135 may correspond to memory requirements, a type of execution platform through which a task is to be executed, CPU requirements, the use of a REST service, a type of data being processed, etc. The execution properties 135 may also correspond to an amount of data being processed, a current storage location of the data, what functions, computes, and transforms will be performed, and/or a variety of other properties relating to the execution of a task.

Various execution environments may be available for executing the tasks, such as a first execution environment 150, a second execution environment 155, a third execution environment 160, and/or any other number and type of execution environments. The execution environments are implemented to provide different computing resources and functionality for executing certain types of tasks. For example, one type of execution environment may be configured to execute database calls while a different execution environment does not execute database calls. Accordingly, each execution environment includes an associated set of execution properties 140 that defines characteristics of the execution environment. The execution properties 140 may be stored in a data structure that is accessible to the pipeline module 105.

A computing system may have any number of execution environments that are available for processing tasks. Example execution environments may comprise a cluster computing environment, a cloud computing environment, a local computing environment, in-memory execution environment, a script execution environment, a particular operating system, a particular application framework or platform, a database execution environment, etc. The execution properties 140 of an execution environment may correspond to available memory, storage, redundancy and data protection, security, service level agreement compliance, REST services, CPU available, multi-tenant services, functions and methods, and/or a variety of other properties relating to a computing environment being able to execute tasks/code.

When determining how to execute a task(s), the pipeline module 105 compares the execution properties 135 of the tasks with the execution properties 140 of the execution environments to assign tasks to execution environments that best match each other. In particular, a task is assigned to an execution environment that provides memory resources, CPU resources, storage resources, security, and/or other execution properties 140 that match requirements for executing the task as indicated by execution properties 135 of that task. In this way, when execution properties 140 of an execution environment match (e.g., satisfy requirements of) execution properties 135 a task, then the task is assigned to the execution environment. Thus, the pipeline module 105 controls the execution pipeline 145 to execute each task within its assigned execution environment.

To prepare a task before the task is executed, the pipeline module 105 transforms execution definitions of tasks into formats compatible for execution by the assigned execution environments. Since the available execution environments are known to the system, the format of data that each execution environment requires is programmed into the system, which may then function as a translator to transform the format of an execution definition of a task to a selected format of an execution environment. In one embodiment, declarative statements within an execution definition of a task are transformed/modified into a format understandable by an execution environment to which the task is assigned. In one embodiment of transforming an execution definition, if the assigned execution environment is a database execution environment, then declarative statements from the task are transformed into database statements executable by a database. In another embodiment of transforming an execution definition, declarative statements are transformed into execution directives executable by a service of the assigned execution environment. In another embodiment of transforming an execution definition, declarative statements are transformed into code executable by a framework. In another embodiment of transforming an execution definition, declarative statements are transformed into a script executable by a scripting engine.

Figure 2:
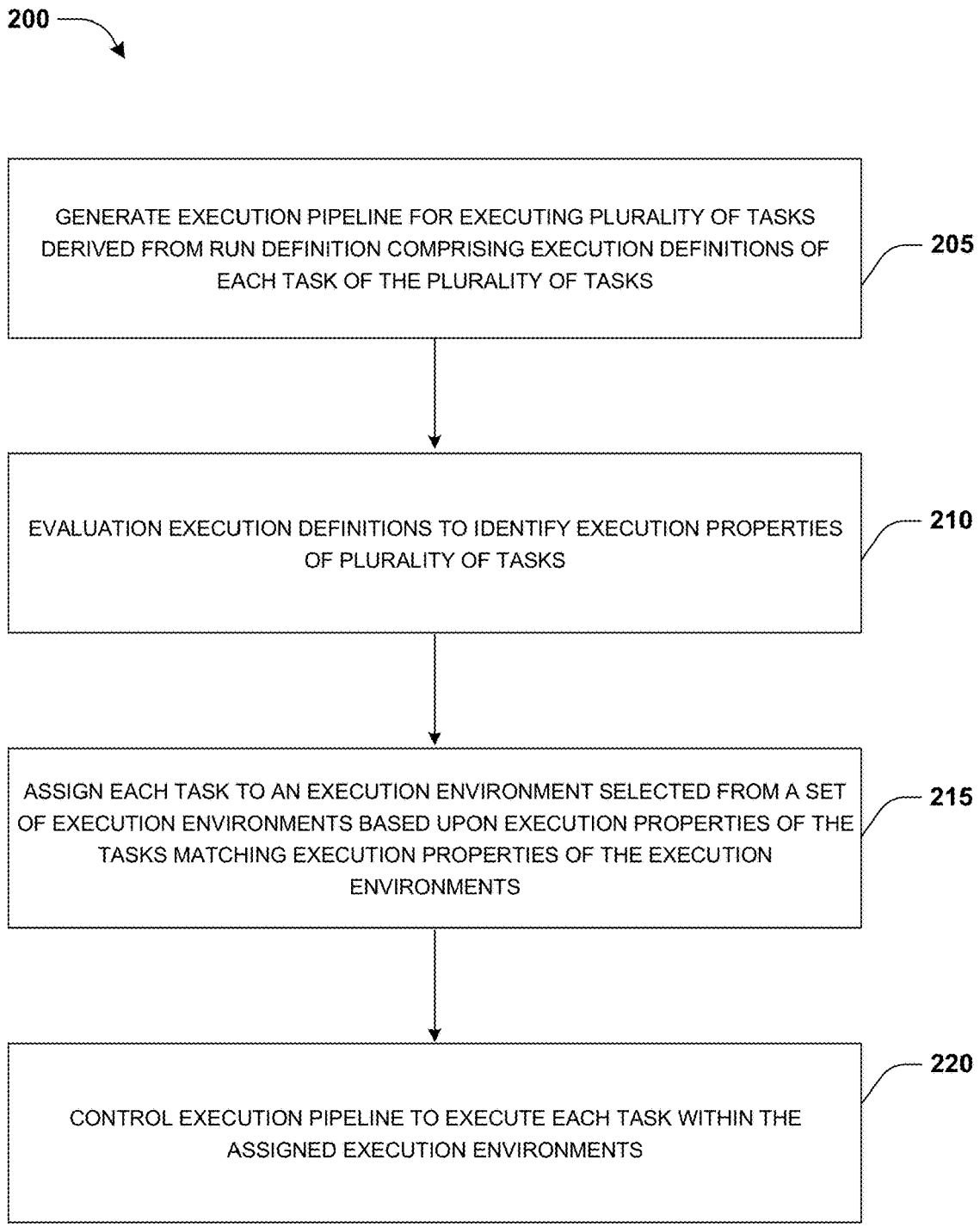
FIG. 2 illustrates an embodiment of a method associated with controlling an execution pipeline.

With reference to FIG. 2, one embodiment of a computer implemented method 200 associated with controlling an execution pipeline is illustrated. In one embodiment, the method 200 is performed by the pipeline module 105 utilizing various computing resources of the computer 915, such as the processor 920 for executing instructions associated with generating and controlling an execution pipeline. Memory 935 and/or disks 955 are used for storing data, such as execution properties, execution definitions, data of the execution pipeline, etc. Network hardware is used for communicating data structures and/or other data between the computer 915 and remote computers over a network, such as for communicating data between the pipeline module 105 and the execution pipeline and execution environments, such as remote execution environments. The method 200 is triggered upon receiving a request to manage the execution of a run comprising a plurality of tasks to be performed.

Figure 3:
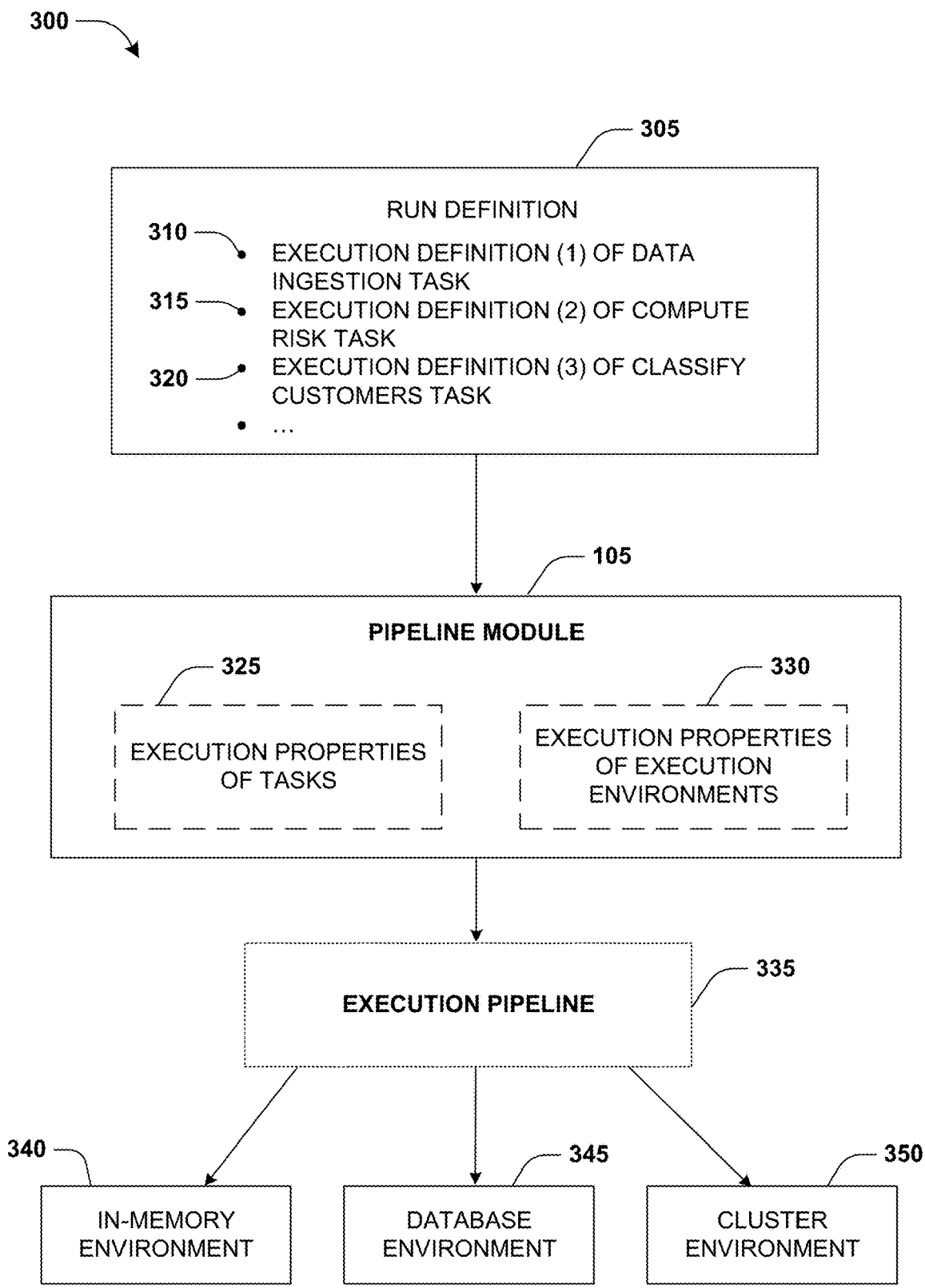
FIG. 3 illustrates an embodiment of a system associated with controlling an execution pipeline.

The pipeline module 105 identifies a run definition 305 of a run comprising a plurality of tasks to be performed, as illustrated by the example system 300 of FIG. 3. The run definition 305 comprises execution definitions of the tasks, such as declarative statements describing how tasks are to be executed. In one embodiment, the run definition 305 comprises a first execution definition 310 of a data ingestion task to ingest data from a data source. The run definition 305 comprises a second execution definition 315 of a compute risk task where a probability of default model and customer data of a bank is used to compute the risk that customers will default on loans. The run definition 305 comprises a third execution definition 320 of a classify customer task where customers are classified based upon their risks. In this way, the run definition 305 may comprise a wide variety of tasks relating to various industries, such tasks that implement business logic of a business, tasks performed by utility companies, billing tasks, human resource tasks, account tasks, etc.

At 205, the pipeline module 105 generates an execution pipeline 335 for executing the tasks of the run, such as the data ingestion task, the compute risk task, the classify customers task, and/or other tasks. The execution pipeline 335 may comprise a data structure of instructions, code, communication functionality to access execution environments, application programming interfaces (APIs), services, REST interfaces, process and control functionality, and/or other functionality to orchestrate the execution of tasks by execution environments.

In one embodiment of generating the execution pipeline 335, a set of data processing elements are defined or selected from available predefined data processing elements. Each data processing element is defined to comprise executable code that can be executed by a processor to perform commands defined by the executable code. A data processing element can be defined to specify inputs and outputs of a command and what instructions will be executed by the command upon the inputs to create the outputs. In an example, the set of data processing elements can be predefined, such that the set of data processing elements are selected from available data processing elements based upon what data processing elements provide desired data processing functionality to achieve a particular output. For example, data processing elements relating to retrieving employee data, calculating healthcare benefit costs, and generating a report can be selected for generating the execution pipeline 335 for reporting out healthcare costs of a company. In one embodiment, the data processing elements can be logically connected with one another, such as in series where the output of one data processing element is used as an input for another data processing element as is known in a pipeline for executing elements by one or more processors.

At 210, the pipeline module 105 evaluates the execution definitions to identify execution properties 325 of the plurality of tasks. In one embodiment, the first execution definition 310 is evaluated to identify a first set of execution properties of the data ingestion task. The second execution definition 315 is evaluated to identify a second set of execution properties of the compute risk task. The third execution definition 320 is evaluated to identify a third set of execution properties of the classify customers task.

In one embodiment, an execution definition of a task has been defined through declarative statements prior to the task being received for execution. In one example, a declarative statement can be defined through declarative programming where the logic and outcome of the task is defined without having to explicitly define the control flow of how the outcome is achieved. For example, declarative programming is used to specify inputs and expected outputs without defining the procedure of how the outputs are achieved. Examples of declarative programming are data query languages such a structured query language (SQL), regular expressions, logical programming, and functionality programming. In another example, the declarative statements of the execution definition have been defined using a markup language, such as HyperText Markup Language (HTML), declarative Extensible Markup Language (XML), or Cascading Style Sheets (CSS). In this way, a run definition may comprise execution definitions of tasks.

Accordingly in one embodiment, the execution definition is parsed using a declarative parser to identify declarative statements (e.g., strings of characters) that define execution properties, parameters of the execution properties, and/or values of the parameters. For example, a declarative statement may be parsed to identify a web address of an external service that is to be accessed during execution of the task, an input to transmit to the external service, and an expected output data type to receive from the external service. In one embodiment, an XML parser is used to extract and process declarative statements defined through declarative XML within the execution definition. The XML parser extracts and processes the declarative statements to identify strings of characters within the execution definition that are indicative of execution properties, parameters of the execution properties, and/or values of those parameters. The XML parser can be trained to identify such information or may match the extracted strings of characters to predefined templates of expected strings of characters and the structure/ordering of the strings of characters that are indicative of such information.

To determine which execution environment will execute a task, the pipeline module 105 accesses or identifies execution properties 330 of available execution environments within which tasks can be executed. Such execution environments can comprise an in-memory execution environment 340, a database execution environment 345, a cluster execution environment 350, and/or other execution environments, such as a software hosting platform, an operating system, a remote service, an application, a cloud service, a multi-tenant service, etc.

At 215, the pipeline module 105 assigns each task to an execution environment selected from the available execution environments based upon execution properties 325 of the tasks matching (e.g., best fit, closest match, a match within a threshold, etc.) execution properties 330 of the execution environments. In one embodiment, the data ingestion task is assigned to the database execution environment 345 based upon the first set of execution properties of the data ingestion task best matching execution properties of the database execution environment 345. The compute risk task is assigned to the in-memory execution environment 340 based upon the second set of execution properties of the compute risk task best matching execution properties of the in-memory execution environment 340. The classify customers task is assigned to the cluster execution environment 350 based upon the third set of execution properties of the classify customers task best matching execution properties of the cluster execution environment 350.

Other tasks may be assigned to particular execution environments. In one embodiment, a task encapsulating a REST service is assigned to the cluster execution environment 350 based upon execution properties of the task best matching execution properties of the cluster execution environment 350. In another embodiment, a compute routine task is assigned to be executed by a REST service execution environment based upon execution properties of the compute routine task best matching execution properties of the REST service execution environment. In another embodiment, a volume data task is assigned to be executed within the database execution environment 345 based upon execution properties of the volume data task indicating that an amount of data being computed by the volume data task exceeds a threshold. For example, it would be more efficient to process data stored within the database in-place within the database execution environment 345 instead of moving the data from the database to a different execution environment. In another embodiment, a transform task is assigned to the in-memory execution environment 340 based upon a determination that the transform task is to be executed in-memory as an atomic operation with results of the transform task being persisted into a database.

In one embodiment, a first execution definition of a first task is evaluated to identify first execution properties specifying functions to execute and resource requirements of the first task. The resource requirements and functions specified by the first execution properties are compared against execution properties of available resources and functions provided by each execution environment to assign ranks to each execution environment based at least on the comparison. Ranks are assigned to the execution environments based upon a degree to which available resources and functions match or exceed the resource requirements and functions specified by the first execution properties.

In one embodiment, if an execution environment does not comprise the requisite functionality or computer resources required to execute a task, then a lowest rank is assigned to the execution environment. In another embodiment, if multiple execution environments comprise at least the minimum requisite functionality and computer resources to execute the task, then each execution environment is ranked based upon various factors. Such factors can correspond to cost of execution, available network bandwidth/processing, available computer resources such as storage and processing resources, current load, expected load, a level of security provided, a level of data redundancy and protection provided, quality of service guarantees, etc. In this way, an execution environment that can execute the task in a more efficient manner than a second execution environment will be ranked higher than the second execution environment. Likewise, if an execution environment can execute the task quicker due to having more computer resources and bandwidth, execute the task more securely, and/or at a lesser cost, the execution environment will be ranked higher than another execution environment that does not. In one embodiment, each parameter of an execution environment may be given a rank sub-value based on the comparison and then all the rank sub-values may be added to determine a final rank value. After the comparison and ranking are complete, a highest ranked execution environment is assigned to execute the task.

In one embodiment, a task may be reassigned to a different execution environment if a better execution environment becomes available. For example, after a task has been assigned to an execution environment, the task can be reassigned to a different execution environment such as an execution environment that became available to the execution pipeline 335 after the initial assignment. Default execution properties of the initially assigned execution environment to use for executing the task may be overridden with execution properties of the reassigned execution environment to use for executing the task. Thus, the task may be transformed into a format understood by the reassigned execution environment.

At 220, the pipeline module 105 controls the execution pipeline 335 to execute each task within the assigned execution environments. In one embodiment, the execution pipeline 335 orchestrates the execution of the data ingestion task within the database execution environment 345. How a task is executed through the pipeline is beyond the scope of this disclosure and is not included. The execution pipeline 335 orchestrates execution of the compute risk task within the in-memory execution environment 340. The execution pipeline 335 orchestrates execution of the classify customers task within the cluster execution environment 350. The execution of tasks may be facilitated using execution definitions of the tasks. Because the execution definitions may be defined through declarative statements or other formats, the execution definitions may be transformed into formats compatible for execution by the assigned execution environments. In one embodiment, the first execution definition 310 of the data ingestion task may be transformed into database statements, such as SQL statements, understood by the database execution environment 345. In one embodiment of executing a task, execution of the task is invoked through an assigned execution environment utilizing a wrapper REST interface.

In one embodiment, a single source operation is performed to source data, used to execute a task (e.g., input data), to an assigned execution environment for execution of the task using the sourced data. In this way, the transfer of data across a network is reduced by performing merely a single source operation instead of transferring the data around a network during execution of tasks. That is, data is sourced once, but processing is spread over various infrastructures of assigned execution environments.

In one embodiment, a schedule may be defined for executing a subset of the tasks across a plurality of assigned execution environments. In this way, the pipeline module 105 controls execution of the execution pipeline 335 to execute the subset of the tasks across the plurality of assigned execution environments according to the schedule.

In one embodiment, tasks may be performed in parallel through a set of execution pipelines comprising the execution pipeline 335 and/or other execution pipelines. If a task does not require the output of another task, then the tasks can be performed in parallel. Subsets of tasks are assigned to each execution pipeline, which are controlled for parallel execution of tasks.

In one embodiment, an interactive path is established between a first execution environment executing a first task and a second execution environment executing a second task. The execution of the first task and the execution of the second task can exchange data over the interactive path between the execution environments. In one embodiment, the interactive path is established by creating a two-way communication channel over a network between the first execution environment and the second execution environment. In this way, communication can be transmitted over the network, such as through data packets of Internet Protocol (IP) transmissions, from a computing device within one of the execution environments to another computing device within the other execution environment.

In another embodiment, execution tracking of task execution by the assigned execution environments may be implemented, such as to track input values, output values, and/or task execution progress. Synchronous or asynchronous execution tracking may be implemented. In this way, access to results of the execution tracking may be provided, such as through a display to a user of a computing device in a synchronous or asynchronous manner.

Figure 4:
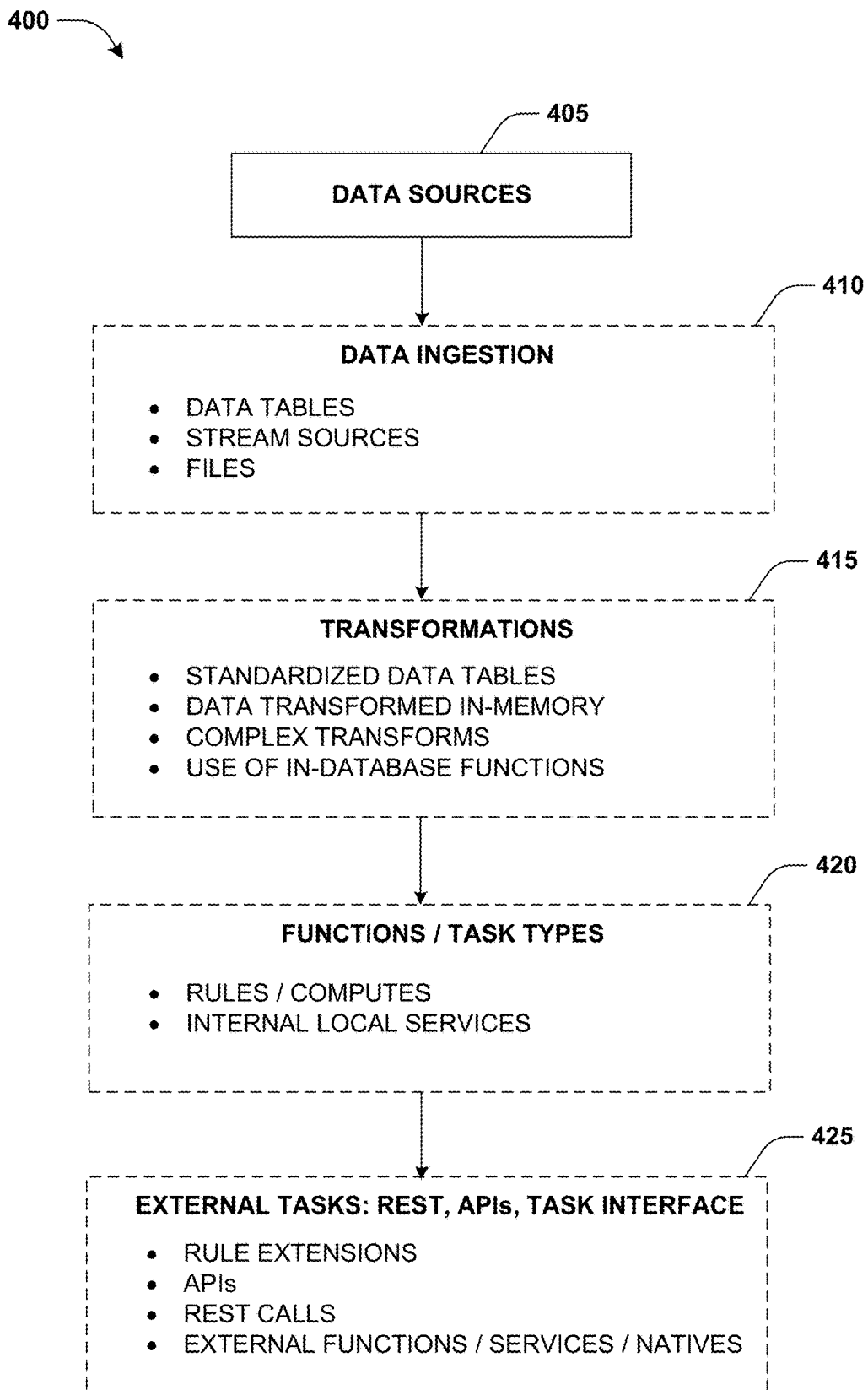
FIG. 4 illustrates an embodiment of a system associated with controlling an execution pipeline associated with data ingestion tasks, transformation tasks, functional tasks, and external tasks.

With reference to FIG. 4, one embodiment of a system flow 400 associated with controlling an execution pipeline is illustrated. The execution pipeline may execute tasks that utilize and process input data from various data sources 405. In this way, a data ingestion step 410 is performed by tasks to ingest input data from data tables of a database, input data from stream sources, input data from files, etc. A transformations step 415 is performed by tasks to transform or otherwise process the input data, such as by the tasks being executed by assigned execution environments being orchestrated by the execution pipeline. In one embodiment, the data tables may be standardized, data may be transformed in-memory, complex transformations may be implemented, in-database functions may be executed, etc.

A functions step 420 is performed by tasks to execute functions, such as by the tasks being executed by the assigned execution environments being orchestrated by the execution pipeline. In one embodiment, tasks may execute functions such as rules, computes, and internal local services hosted on a local device. An external tasks step 425 is performed by tasks to execute external functionality, such as by the tasks being executed by the assigned execution environments being orchestrated by the execution pipeline. In one embodiment, tasks may execute or invoke rule extensions, APIs, REST calls, external functions, services, and/or natives. In this way, various tasks may be executed through execution environments by the execution pipeline.

Figure 5:
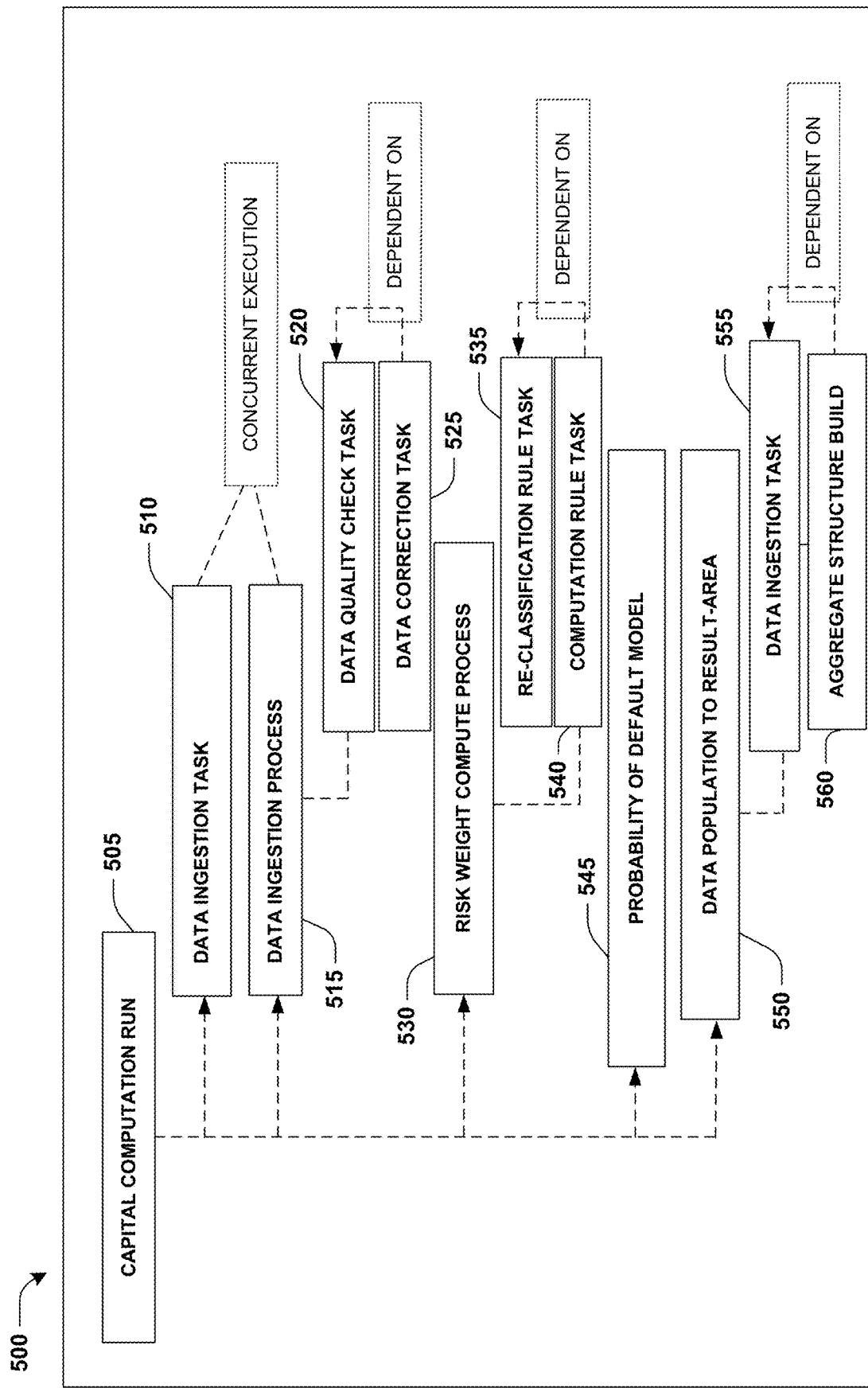
FIG. 5 illustrates an embodiment of a system associated with controlling an execution pipeline, where tasks of a computation run are executed using the execution pipeline.

With reference to FIG. 5, one embodiment of a system flow 500 associated with controlling an execution pipeline is illustrated. A run, such as a capital computation run 505 that calculates capital of a business, may comprise various tasks whose execution is orchestrated by the execution pipeline. Such tasks are assigned by a pipeline module to selected execution environments having execution properties best matching execution properties of the tasks. Certain tasks may be concurrently executed within assigned execution environments by the execution pipeline, such as a data ingestion task 510 and a data ingestion process task 515. Other tasks may depend upon the output of other tasks.

The pipeline module may assign the data ingestion task 510 to a particular execution environment suited for executing the data ingestion task 510 based upon execution properties of the data ingestion task 510 and execution properties of that execution environment. The pipeline module may assign the data ingestion process task 515 to a particular execution environment suited for executing the data ingestion process task 515 based upon execution properties of the data ingestion process task 515 and execution properties of that execution environment.

The pipeline module may assign a data quality check task 520 to a particular execution environment suited for executing the data quality check task 520 based upon execution properties of the data quality check task 520 and execution properties of that execution environment. The pipeline module may assign a data correction task 525 to a particular execution environment suited for executing the data correction task 525 based upon execution properties of the data correction task 525 and execution properties of that execution environment.

The pipeline module may assign a risk weight compute process 530 to a particular execution environment suited for executing the risk weight compute process 530 based upon execution properties of the risk weight compute process 530 and execution properties of that execution environment. The pipeline module may assign a re-classification rule task 535 to a particular execution environment suited for executing the re-classification rule task 535 based upon execution properties of the re-classification rule task 535 and execution properties of that execution environment. The pipeline module may assign a computation rule task 540 to a particular execution environment suited for executing the computation rule task 540 based upon execution properties of the computation rule task 540 and execution properties of that execution environment.

The pipeline module may assign a probability of default model task 545 to a particular execution environment suited for executing the probability of default model task 545 based upon execution properties of the probability of default model task 545 and execution properties of that execution environment. The pipeline module may assign a data population to result-area task 550 to a particular execution environment suited for executing the data population to result-area task 550 based upon execution properties of the data population to result-area task 550 and execution properties of that execution environment.

The pipeline module may assign a data ingestion task 555 to a particular execution environment suited for executing the data ingestion task 555 based upon execution properties of the data ingestion task 555 and execution properties of that execution environment. The pipeline module may assign an aggregate structure build task 560 to a particular execution environment suited for executing the aggregate structure build task 560 based upon execution properties of the aggregate structure build task 560 and execution properties of that execution environment. In this way, each task may be assigned to a particular execution environment that can efficiently execute each task, such as in a manner that reduces processing resources, network bandwidth otherwise wasted in moving data over a network, etc.

Figure 6:
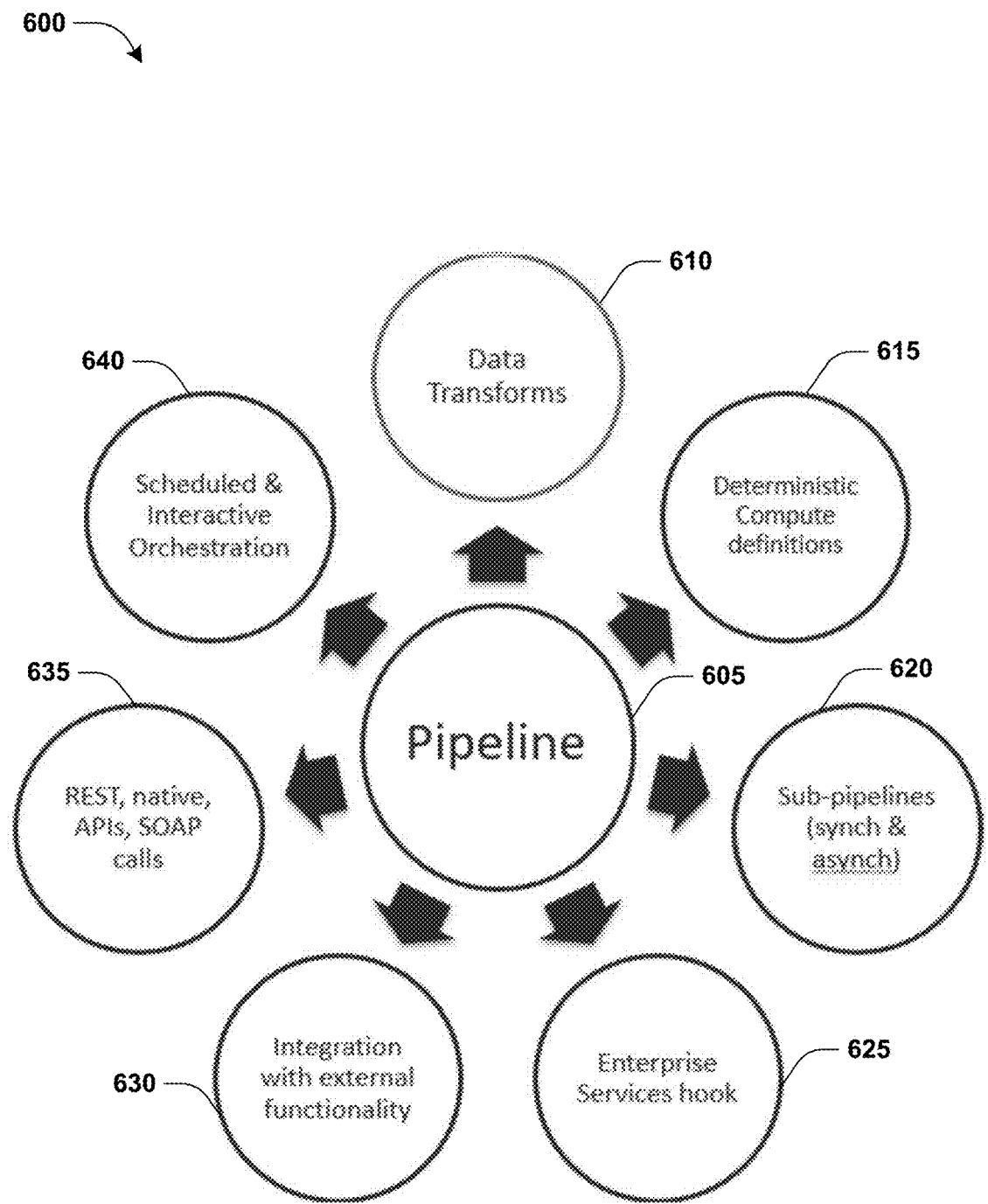
FIG. 6 illustrates an embodiment of a system associated with controlling an execution pipeline, where the execution pipeline executes a plurality of tasks using execution environments.

With reference to FIG. 6, one embodiment of a system flow 600 associated with controlling an execution pipeline is illustrated. An execution pipeline 605 is created by a pipeline module to orchestrate the execution of tasks within assigned execution environments. The execution pipeline 605 can orchestrate execution of data transforms 610 of a task. In one embodiment, the task may transform data by executing a command upon input data to transform the input data to output data, such as by calculating a risk score of a business acquisition based upon parameters of the business acquisition. Accordingly, the execution pipeline 605 assigns the task to an execution environment that can execute the data transforms 610 of the task.

The execution pipeline 605 can orchestrate execution of deterministic compute definitions 615 of a task. In one embodiment, the task may execute deterministic algorithms where for each operational state there is only one operational state that can follow. The deterministic compute definitions 615 may define the deterministic algorithms. Accordingly, the execution pipeline 605 assigns the task to an execution environment that can execute the deterministic compute definitions 615 of the task. The execution pipeline 605 can orchestrate the execution of sub-pipelines 620 in a synchronous or asynchronous manner, such as for parallel execution of tasks. In one embodiment, the execution pipeline 605 creates and controls multiple execution pipelines as the sub-pipelines 620 to execute a plurality of tasks. The execution pipeline 605 assigns subsets of the plurality of tasks to each sub-pipeline. In this way, the execution pipeline 605 can control the execution of the sub-pipelines 620.

The execution pipeline 605 can orchestrate execution of an enterprise services hook 625 to connect tasks to services for execution. In one embodiment, the execution pipeline 605 establishes a communication channel as the enterprise services hook 625 between a task and a service hosted by a remote computing device so that the service can execute the task. In this way, the service can use the communication channel to obtain input from the task and transmit output back to the task. The execution pipeline 605 can orchestrate execution of the integration of tasks with external functionality 630, such as functionality provided by a remote computing device or service. In one embodiment, the execution pipeline 605 establishes a communication channel over a network with a remote computing device hosting external functionality used to execute a task. In this way, the remote computing device can use the communication channel to obtain input from the task and transmit output back to the task.

The execution pipeline 605 can orchestrate execution of REST, natives, APIs, and simple object access protocol (SOAP) calls 635. In one embodiment, the execution pipeline 605 can perform an API call to execution functionality used to execute a task. The execution pipeline 605 can orchestrate execution of the scheduling of tasks and facilitate interaction between tasks 640 such as to communicate data and commands between tasks executing in various execution environments. In one embodiment, a first task may output data that is used as an input to a second task. Accordingly, the execution pipeline 605 establishes a communication channel between the first task and the second task so that the first task can transmit the output data to the second task.

Figure 7:
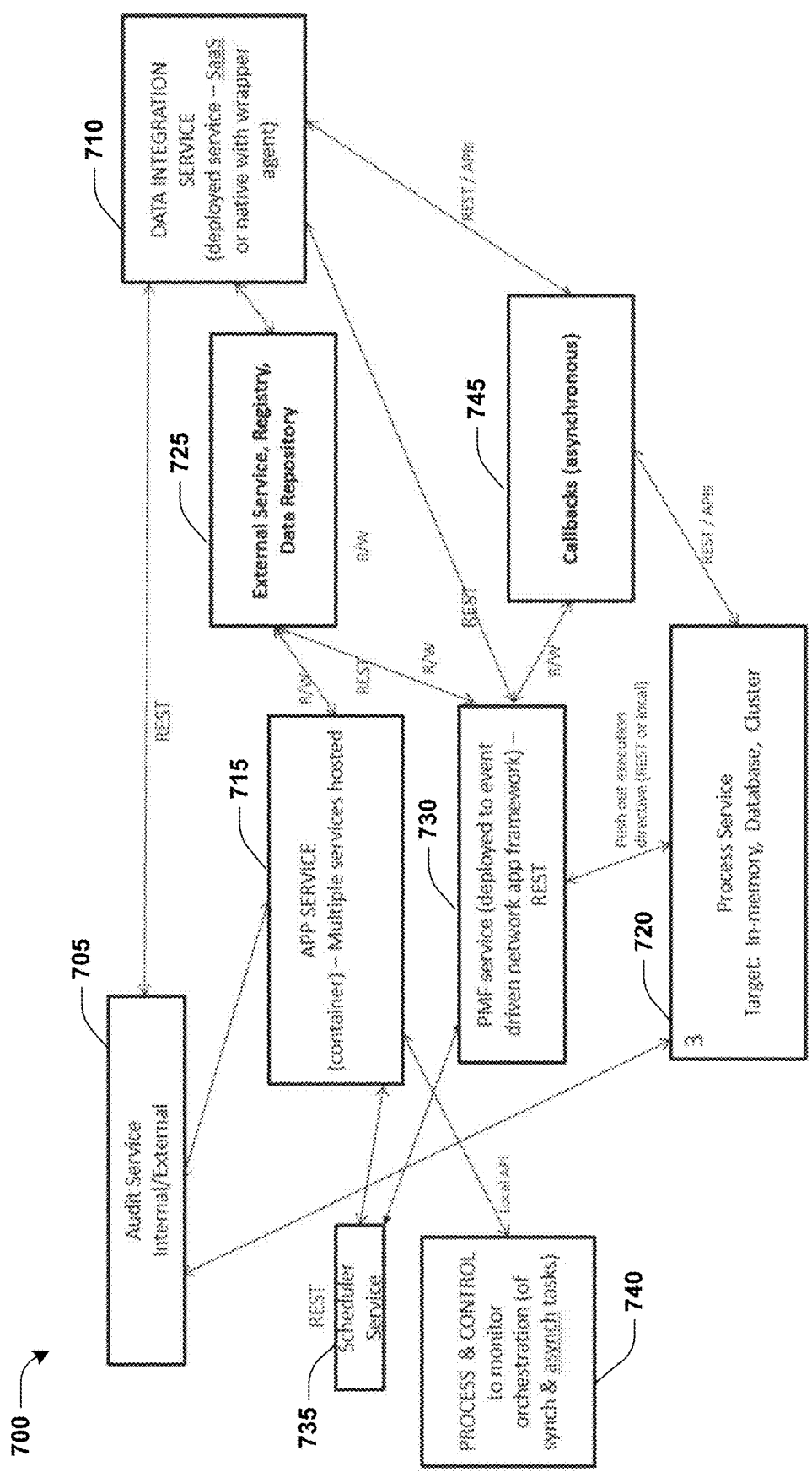
FIG. 7 illustrates an embodiment of a system associated with controlling an execution pipeline, where tasks of an audit service are executed using the execution pipeline.

With reference to FIG. 7, one embodiment of a system flow 700 associated with controlling an execution pipeline is illustrated. An execution pipeline is created by a pipeline module to orchestrate the execution of tasks within assigned execution environments. The execution pipeline can orchestrate execution of an internal or external service, such as an audit service 705 that performs auditing tasks. In one embodiment, the audit service 705 is hosted by an execution environment to which an auditing task is assigned for execution. Thus, the execution pipeline can facilitate the execution of the auditing task by the audit service 705. The execution pipeline can facilitate the execution of a data integration service 710, such as a deployed service (e.g., software as a service (SaaS) or a native with a wrapper agent), which provides data integration tasks. In one embodiment, the data integration service 710 is hosted by an execution environment to which a data integration task is assigned for execution. Thus, the execution pipeline can facilitate the execution of the data integration task by the data integration service 710.

The execution pipeline can orchestrate execution of an app service 715, such as a container hosting multiple services, which provides application task execution. In one embodiment, the app service 715 is hosted by an execution environment to which an application task is assigned for execution. Thus, the execution pipeline can facilitate the execution of the application task by the app service 715. The execution pipeline can orchestrate execution of a process service 720, such as execution environments that are in-memory, part of a database, or part of a cluster that can execute tasks assigned to such execution environments. In one embodiment, execution definitions of tasks can be formatted into execution directives that are pushed out to the process service 720, such as through REST or through local communication. For example, an execution definition of a task is formatted into a format understood by an execution environment that is to execute the task. Accordingly, the formatted execution definition is transmitted to the execution environment for execution of the task.

The execution pipeline can orchestrate execution of external services, registries, and/or data repositories 725 used for task execution. In one embodiment, a remote computing device hosts a remote execution environment assigned to execute a task using services, data repositories, and/or other computer resources. Accordingly, the execution pipeline orchestrates the execution of the services and the utilization of the data repositories to execute and store data of the task. The execution pipeline can orchestrate execution of a pipeline module service 730, such as an event driven network app framework that utilizes a REST interface, which facilitates the execution of tasks through assigned execution environments. That is, the pipeline module service 730 may be used to transmit data used to execute a task to a corresponding assigned execution environment.

The execution pipeline can orchestrate execution of a schedule service 735 used to schedule execution of tasks through assigned execution environments. For example, certain tasks can be scheduled for execution at certain times and/or according to a certain task execution order. The execution pipeline can orchestrate execution of process and control functionality 740 to monitor the orchestration of synchronous and asynchronous tasks. The execution pipeline can orchestrate execution of callbacks 745 for asynchronous tasks. A first task may call a second task to execute and provide back results of the execution through a call back to the first task. In this way, the execution of tasks within various execution environments may be orchestrated.

Figure 8:
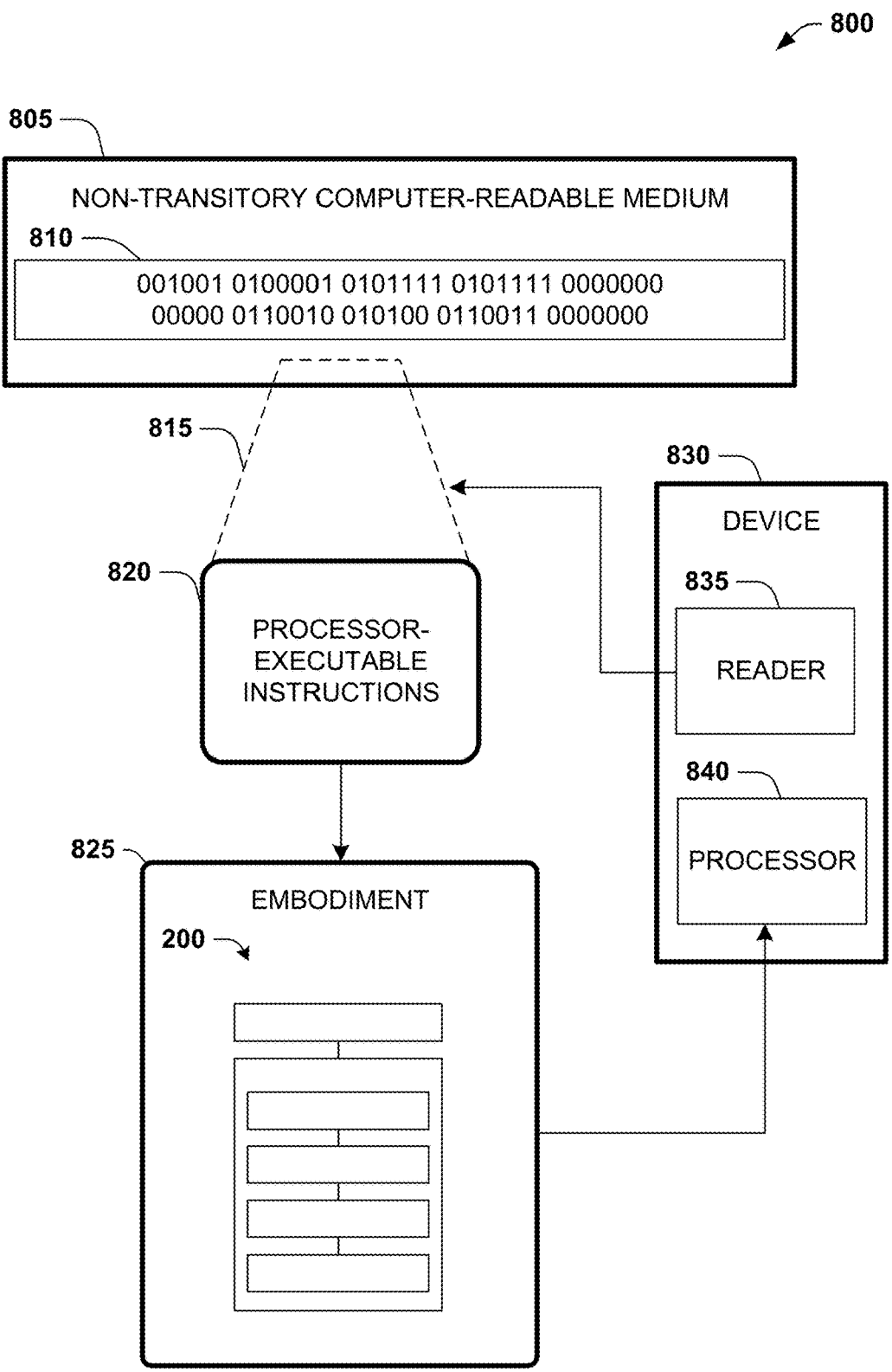
FIG. 8 illustrates an embodiment of a non-transitory computer-readable medium.

FIG. 8 is an illustration of a scenario 800 involving an example non-transitory computer-readable medium 805. In one embodiment, one or more of the components described herein are configured as program modules, such as the pipeline module 105, stored in the non-transitory computer-readable medium 805. The program modules are configured with stored instructions, such as processor-executable instructions 820, that when executed by at least a processor, such as processor 840, cause the computing device to perform the corresponding function(s) as described herein. In one embodiment, the, functionality of the pipeline module 105, stored in the non-transitory computer-readable medium 805, may be executed by the processor 840 as the processor-executable instructions 820 to perform an embodiment 825 of the method 200 of FIG. 2.

The non-transitory computer-readable medium 805 includes the processor-executable instructions 820 that when executed by a processor 840 cause performance of at least some of the provisions herein. The non-transitory computer-readable medium 805 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 805 stores computer-readable data 810 that, when subjected to reading 815 by a reader 835 of a device 830 (e.g., a read head of a hard disk drive, or a read operation invoked on a solid-state storage device), express the processor-executable instructions 820.

In some embodiments, the processor-executable instructions 820, when executed cause performance of operations, such as at least some of the example method 200 of FIG. 2, for example. In some embodiments, the processor-executable instructions 820 are configured to cause implementation of a system, such as at least some of the example system 100 of FIG. 1, for example.

Figure 9:
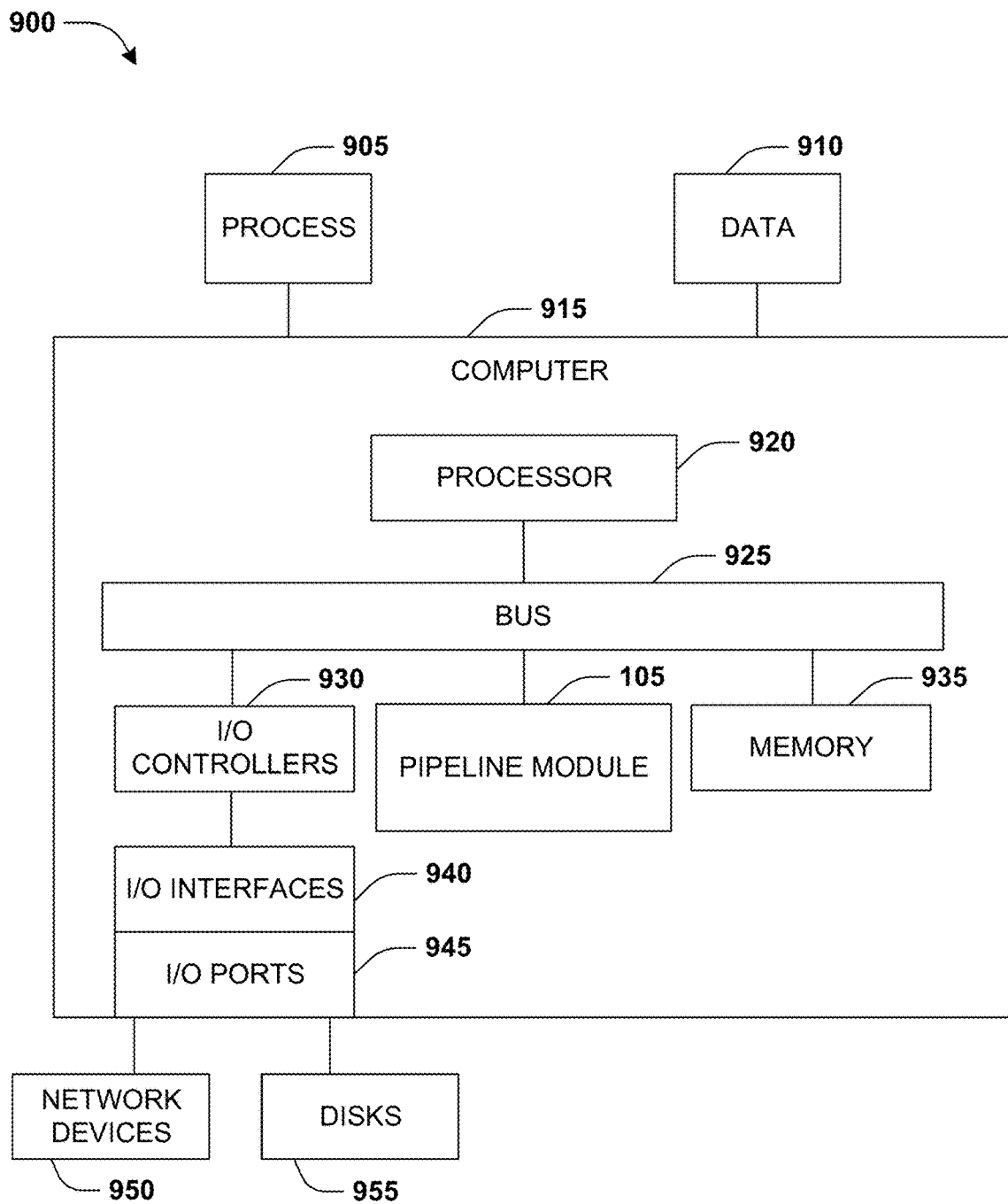
FIG. 9 illustrates an embodiment of a computing system configured with the example systems and/or methods disclosed.

FIG. 9 illustrates an example computing device 900 that is configured and/or programmed with one or more of the example systems and methods described herein, and/or equivalents. The example computing device 900 may be the computer 915 that includes a processor 920, a memory 935, and I/O ports 945 operably connected by a bus 925. In one embodiment, the, the computer 915 may include logic of the pipeline module 105 configured to facilitate the system 100 and/or the method 200 shown in FIGS. 1-2. In different embodiments, the logic of the pipeline module 105 may be implemented in hardware, a non-transitory computer-readable medium 905 with stored instructions, firmware, and/or combinations thereof. While the logic of the pipeline module 105 is illustrated as a hardware component attached to the bus 925, it is to be appreciated that in other embodiments, the logic of the pipeline module 105 could be implemented in the processor 920, stored in memory 935, or stored in disk 955.

In one embodiment, logic of the pipeline module 105 or the computer 915 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 915 as data 910 that are temporarily stored in memory 935 and then executed by processor 920.

The logic of the pipeline module 105 may also provide means (e.g., hardware, non-transitory computer-readable medium 905 that stores executable instructions, firmware) for performing rule based source sequencing for allocation.

Generally describing an example configuration of the computer 915, the processor 920 may be a variety of various processors including dual microprocessor and other multi-processor architectures. The memory 935 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 955 may be operably connected to the computer 915 via, for example, the I/O interface 940 (e.g., card, device) and the I/O ports 945. The disks 955 may be, for example, a magnetic disk drive, a solid state disk drive, a floppy disk drive, a tape drive, a Zip drive, a flash memory card, a memory stick, and so on. Furthermore, the disks 955 may be a CD-ROM drive, a CD-R drive, a CD-RW drive, a DVD ROM, and so on. The memory 935 can store a process, such as within the non-transitory computer-readable medium 905, and/or data 910, for example. The disk 955 and/or the memory 935 can store an operating system that controls and allocates resources of the computer 915.

The computer 915 may interact with input/output (I/O) devices via the I/O interfaces 940 and the I/O ports 945. The I/O devices may be, for example, a keyboard, a microphone, a pointing and selection device, cameras, video cards, displays, the disks 955, the network devices 950, and so on. The I/O ports 945 may include, for example, serial ports, parallel ports, and USB ports. I/O controllers 930 may connect the I/O interfaces 940 to the bus 925.

The computer 915 can operate in a network environment and thus may be connected to the network devices 950 via the I/O interfaces 940, and/or the I/O ports 945. Through the network devices 950, the computer 915 may interact with a network. Through the network, the computer 915 may be logically connected to remote computers (e.g., the computer 915 may reside within a distributed computing environment to which clients may connect). Networks with which the computer 915 may interact include, but are not limited to, a local area network (LAN), a new area network (WAN), and other networks.

Figure 10:
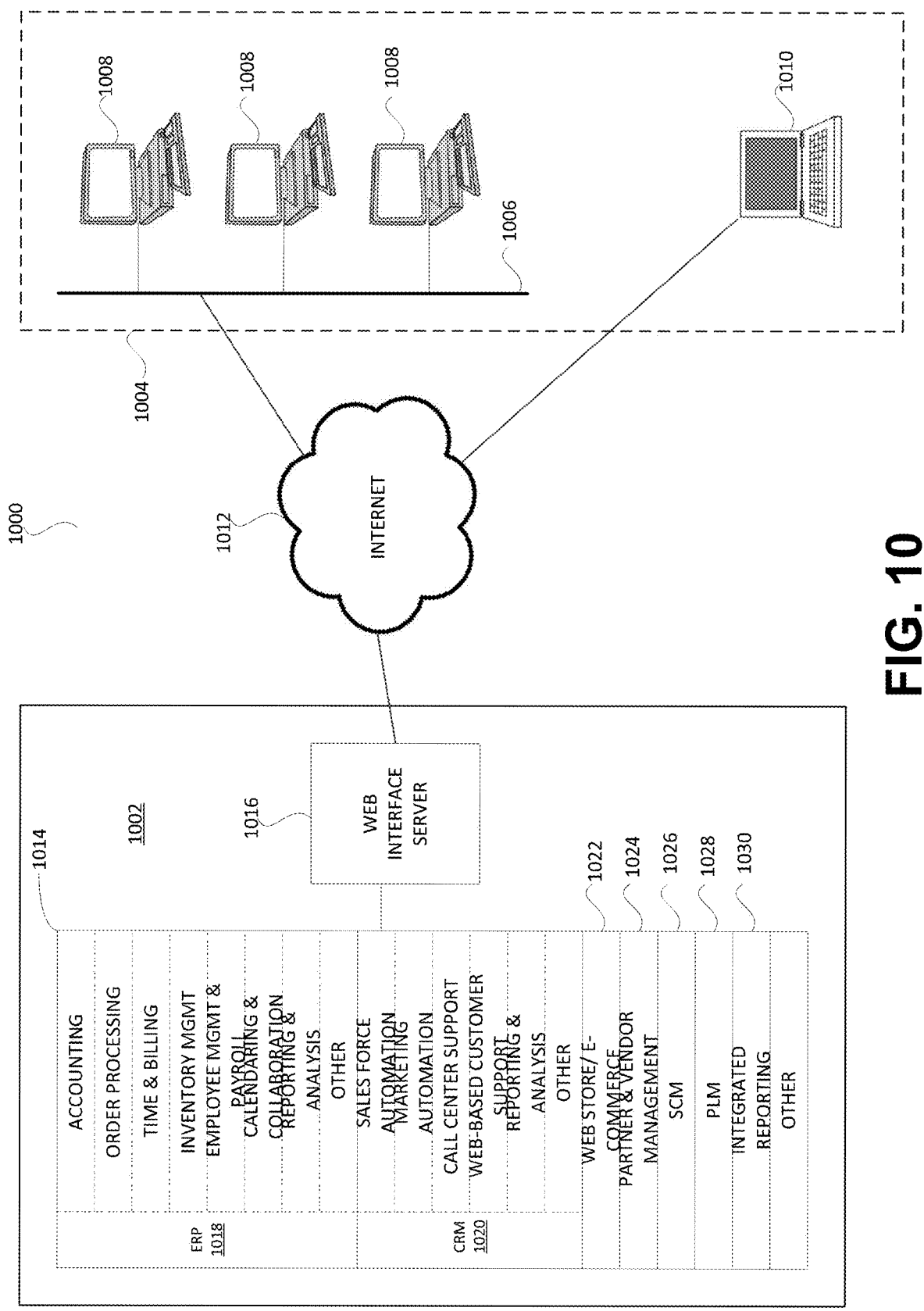
FIG. 10 illustrates an embodiment of an integrated business system and an enterprise network in which an embodiment of the invention may be implemented.

FIG. 10 is a diagram illustrating a system 1000 in which an embodiment of the invention may be implemented. Enterprise network 1004 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 1004 is represented by an on-site local area network 1006 to which a plurality of personal computers 1008 are connected, each generally dedicated to a particular end user, such as a service agent or other employee (although such dedication is not required), along with an exemplary remote user computer 1010 that can be, for example, a laptop computer or tablet computer of a traveling employee having internet access through a public Wi-Fi access point, or other internet access method. The end users (consumers) associated with computers 1008 and 1010 may possess an internet-enabled smartphone or other electronic device (such as a PDA, tablet, laptop computer) having wireless internet access or other synchronization capabilities. Users of the enterprise network 1004 interface with the integrated business system 1002 across the Internet 1012 or another suitable communications network or combination of networks.

Integrated business system 1002, which may be hosted by a dedicated third party, may include an integrated business server 1014 and a web interface server 1016, coupled as shown in FIG. 10. It is to be appreciated that either or both of the integrated business server 1014 and the web interface server 1016 may be implemented on one or more different hardware systems and components, even though represented as singular units in FIG. 10.

In a typical example in which system 1002 is operated by a third party for the benefit of multiple account owners/tenants, each of whom is operating a business, integrated business server 1014 comprises an ERP module 1018 and further comprises a CRM module 1020. In many cases, it will be desirable for the ERP module 1018 to share methods, libraries, databases, subroutines, variables, etc., with CRM module 1020, and indeed ERP module 1018 may be intertwined with CRM module 1020 into an integrated Business Data Processing Platform (which may be single tenant, but is typically multi-tenant).

The ERP module 1018 may include, but is not limited to, a finance and accounting module, an order processing module, a time and billing module, an inventory management and distribution module, an employee management and payroll module, a calendaring and collaboration module, a reporting and security module, and other ERP-related modules. The CRM module 1020 may include, but is not limited to, a sales force automation (SFA) module, a marketing automation module, a contact list module (not shown), a call center support module, a web-based customer support module, a reporting and security module, and other CRM-related modules. The integrated business server 1014 (or multi-tenant data processing platform) further may provide other business functionalities including a web store/eCommerce module 1022, a partner and vendor management module 1024, and an integrated reporting module 1030. An SCM (supply chain management) module 1026 and PLM (product lifecycle management) module 1028 may also be provided. Web interface server 1016 is configured and adapted to interface with the integrated business server 1014 to provide one or more web-based user interfaces to end users of the enterprise network 1004.

The integrated business system shown in FIG. 10 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 11:
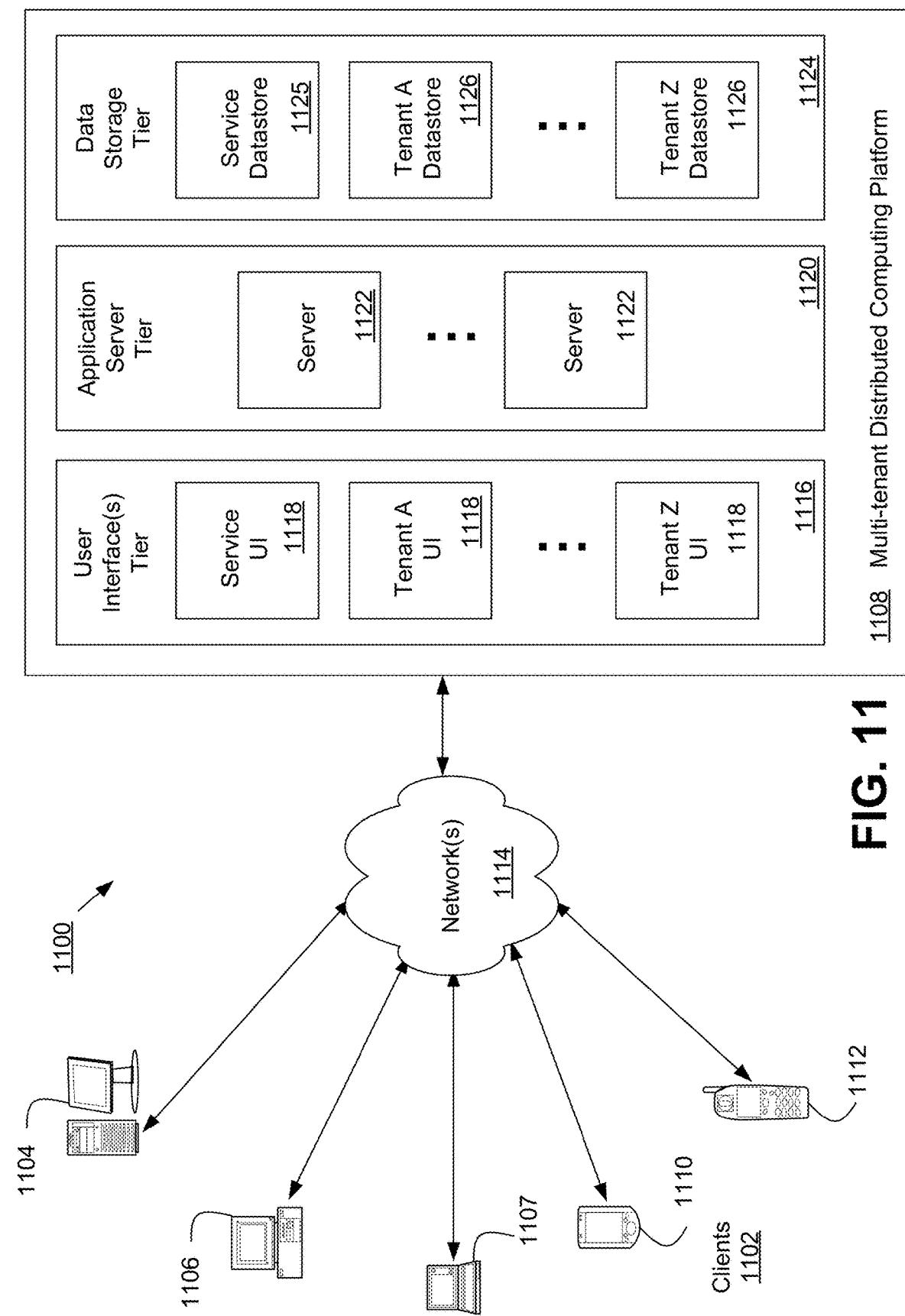
FIG. 11 illustrates an embodiment of a multi-tenant distributed computing service platform.

FIG. 11 is a diagram illustrating elements or components of an example operating environment 1100 in which an embodiment of the invention may be implemented. As shown, a variety of clients 1102 incorporating and/or incorporated into a variety of computing devices may communicate with a distributed computing service/platform 1108 through one or more networks 1114. For example, a client may incorporate and/or be incorporated into a client application (e.g., software) implemented at least in part by one or more of the computing devices. Examples of suitable computing devices include personal computers, server computers 1104, desktop computers 1106, laptop computers 1107, notebook computers, tablet computers or personal digital assistants (PDAs) 1110, smart phones 1112, cell phones, and consumer electronic devices incorporating one or more computing device components, such as one or more electronic processors, microprocessors, central processing units (CPU), or controllers. Examples of suitable networks 1114 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 1108 may include multiple processing tiers, including a user interface tier 1116, an application server tier 1120, and a data storage tier 1124. The user interface tier 1116 may maintain multiple user interfaces 1118, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 1124 may include one or more data stores, which may include a Service Data store 1125 and one or more Tenant Data stores 1126.

Each tenant data store 1126 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 1108 may be multi-tenant and service platform 1108 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 1122 that are part of the platform's Application Server Tier 1120.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 1122 that are part of the platform's Application Server Tier 1120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

As noted with regards to FIG. 10, the integrated business system shown in FIG. 11 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
    generate an execution pipeline for executing a plurality of tasks derived from a run definition comprising execution definitions of each task of the plurality of tasks, wherein the run definition includes declarative statements describing how each of the tasks are to be executed;
    evaluate the execution definitions to identify execution properties of each of the plurality of tasks;
    assign each task of the plurality of tasks to an execution environment selected from a set of execution environments based upon the execution properties of each of the tasks matching execution properties of each of the execution environments, wherein each execution environment executes each of the tasks with different resources and functionality;
    evaluate a first execution definition of a first task to identify first execution properties specifying functions to execute and resource requirements of the first task;
    compare resource requirements and functions specified by the first execution properties against execution properties of available resources and functions provided by each execution environment to assign ranks to each execution environment based upon a degree to which available resources and functions match or exceed the resource requirements and functions specified by the first execution properties;
    assign the first task to an execution environment having a highest rank or a rank exceeding a threshold; and
    control the execution pipeline to execute each task within the assigned execution environments, wherein the execution definitions of each task are transformed into formats compatible for execution by the assigned execution environments.

2. The non-transitory computer-readable medium of claim 1, wherein the instructions to assign each task comprise instructions to:
    evaluate the first execution definition of the first task to identify the first execution properties specifying functions to execute and resource requirements of the first task;
    evaluate a second execution definition of a second task to identify second execution properties specifying functions to execute and resource requirements of the second task;
    assign the first task to the first execution environment selected from the set of execution environments based upon the resource requirements and functions specified by the first execution properties matching execution properties of available resources and functions provided by the first execution environment; and
    assign the second task to a second execution environment selected from the set of execution environments based upon the resource requirements and functions specified by the second execution properties matching execution properties of available resources and functions provided by the second execution environment.

3. The non-transitory computer-readable medium of claim 1, wherein the instructions comprise instructions to:
    implement asynchronous execution tracking of task execution by the assigned execution environments; and
    provide access to results of the asynchronous execution tracking.

4. The non-transitory computer-readable medium of claim 1, wherein the instructions comprise instructions to:
    define a schedule for executing a subset of the tasks across a plurality of assigned execution environments; and
    control the execution pipeline to execute the subset of the tasks across the plurality of assigned execution environments according to the schedule.

5. The non-transitory computer-readable medium of claim 1, wherein the instructions to assign each task comprise instructions to:
    determine that a transform task is to be executed within an in-memory execution environment as an atomic operation with results of the transform task being persisted into a database based upon execution properties of the transform task; and
    assign the transform task to the in-memory execution environment.

6. The non-transitory computer-readable medium of claim 1, wherein the instructions comprise instructions to:
    create a set of execution pipelines comprising at least the execution pipeline;
    assign subsets of the plurality of tasks to each of the execution pipelines of the set of execution pipelines; and
    control the set of execution pipelines for parallel execution of tasks of the plurality of tasks.

7. The non-transitory computer-readable medium of claim 1, wherein the instructions comprise instructions to:
    transform an execution definition of a task from a declarative statement format into a format used by an assigned execution environment by creating commands understood by the assigned execution environment from the declarative statements within the execution definition.

8. A computing system, comprising:
a processor connected to memory; and
a pipeline module stored on a non-transitory computer readable medium and configured with instructions that when executed by the processor cause the processor to:
generate an execution pipeline for executing a plurality of tasks derived from a run definition comprising execution definitions of each task of the plurality of tasks, wherein the run definition includes declarative statements describing how each of the tasks are to be executed;
evaluate the execution definitions to identify execution properties of the plurality of tasks;
assign each task of the plurality of tasks to an execution environment selected from a set of execution environments based upon the execution properties of the tasks matching execution properties of the execution environments, wherein each execution environment executes tasks with different resources and functionality;
evaluate a first execution definition of a first task to identify first execution properties specifying functions to execute and resource requirements of the first task;
compare resource requirements and functions specified by the first execution properties against execution properties of available resources and functions provided by each execution environment to assign ranks to each execution environment based upon a degree to which available resources and functions match or exceed the resource requirements and functions specified by the first execution properties;
assign the first task to an execution environment having a highest rank or a rank exceeding a threshold; and
control the execution pipeline to execute each task within the assigned execution environments, wherein execution definitions of each task are transformed into formats compatible for execution by the assigned execution environments.

9. The computing system of claim 8, wherein the instructions comprise instructions that cause the processor to:
evaluate an execution definition of a volume data task to identify an amount of data to be processed;
compare the amount of data to be processed to execution properties of available data storage and processing resources provided by execution environments to identify a database execution environment providing data storage and processing resources matching or exceeding the amount of data to be processed; and
assign the volume data task to the database execution environment.

10. The computing system of claim 8, wherein the comprise instructions that cause the processor to:
evaluate an execution definition of a task to determine that the task encapsulates a representational state transfer (REST) service;
compare the execution definition to execution properties of services provided by execution environments to identify a remote cluster execution environment providing services corresponding to the REST service; and
assign the task to the remote cluster execution environment.

11. The computing system of claim 8, wherein the instructions comprise instructions that cause the processor to:
evaluate an execution definition of a compute routine task to determine that the task is to perform a compute function;
compare the execution definition to execution properties of functions provided by execution environments to identify a representational state transfer (REST) service execution environment providing functions corresponding to the compute function; and
assign the compute routine task to the REST service execution environment.

12. The computing system of claim 8, wherein the instructions comprise instructions that cause the processor to:
reassign a task from an assigned execution environment to a target execution environment.

13. The computing system of claim 12, wherein the instructions to reassign the task comprise instructions that cause the processor to:
override default execution properties of the assigned execution environment with execution properties of the target execution environment.

14. A computer-implemented method, the computer-implemented method involving a computing device comprising a processor, and the computer-implemented method comprising:
generating, by the processor, an execution pipeline for executing a plurality of tasks derived from a run definition comprising execution definitions of each task of the plurality of tasks, wherein the run definition includes declarative statements describing how each of the tasks are to be executed;
evaluating, by the processor, the execution definitions to identify execution properties of the plurality of tasks;
assigning, by the processor, each task of the plurality of tasks to an execution environment selected from a set of execution environments based upon the execution properties of the tasks matching execution properties of the execution environments, wherein each execution environment executes tasks with different resources and functionality;
evaluating a first execution definition of a first task to identify first execution properties specifying functions to execute and resource requirements of the first task;
comparing resource requirements and functions specified by the first execution properties against execution properties of available resources and functions provided by each execution environment to assign ranks to each execution environment based upon a degree to which available resources and functions match or exceed the resource requirements and functions specified by the first execution properties;
assigning the first task to an execution environment having a highest rank or a rank exceeding a threshold; and
controlling, by the processor, the execution pipeline to execute each task within the assigned execution environments, wherein execution definitions of each task are transformed into formats compatible for execution by the assigned execution environments.

15. The computer-implemented method of claim 14, further comprising:
invoking execution of a task through an assigned execution environment utilizing a wrapper representational state transfer (REST) interface.

16. The computer-implemented method of claim 14, further comprising:
establishing an interactive path between execution of a first task within a first execution environment and a second task within a second execution environment, wherein data is exchanged over the interactive path.

17. The computer-implemented method of claim 14, further comprising:
- evaluating the first execution definition of a first task to identify the first execution properties of the first task;
- evaluating a second execution definition of a second task to identify second execution properties of the second task;
- assigning the first task to an in-memory execution environment based upon the first execution properties matching execution properties of the in-memory execution environment; and
- assigning the second task to a database execution environment based upon the second execution properties matching execution properties of the database execution environment.

18. The computer-implemented method of claim 17, further comprising:
- evaluating a third execution definition of a third task to identify third execution properties of the third task; and
- assigning the third task to a remote cluster execution environment based upon the third execution properties matching execution properties of the remote cluster execution environment.

* * * * *